M8818 OR X 6,754 EXAMINERS' ROOM
E. Britton.
Bee Hive.
No. 6,754 Patented Sept. 9, 1831.
Top of 1st Box.
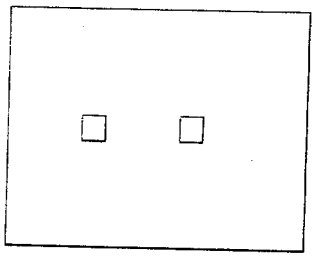
Section
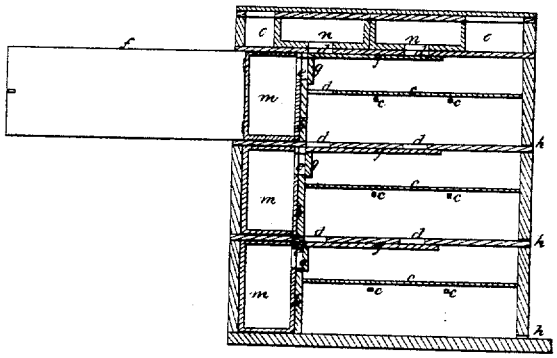
Section
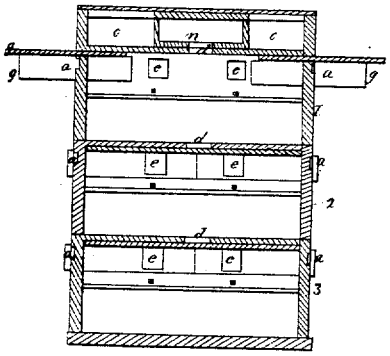
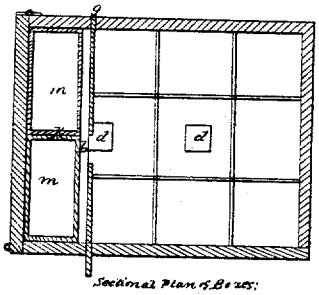
Section of Plan of Boxes.
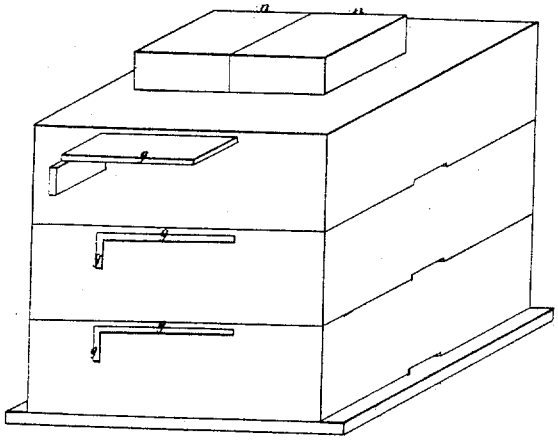
N. PETERS, PHOTO-LITHOGRAPHER, WASHINGTON, D. C.

Eben Britton, Littlefalls, New York

Letters Patent.

The Schedule referred to in these Letters Patent, and making part of the same, containing a description in the words of the said Eben Britton himself, of his improvement in the Beehive and the art of managing Bees.

Be it known that I Eben Britton of the town of Littlefalls in the County of Herkimer and State of New york, have invented a new and useful improvement in the Bee hive and in the Art of Managing Bees & that the following is a full & exact description of the construction & operation of the same as invented or improved by me, to wit.

The Hive is chiefly composed of three boxes of equal dimensions, being each two feet one inch in length, one foot eight inches in width and eight inches in height, or in nearly that proportion. The boards of which these boxes are made may be an inch or more in thickness at the ends and sides — but the board on the top should be about a half inch in thickness and placed lengthwise of the board across the hive. At the upper edge of each box on each side near the end and just under the lower edge of the top board are two grooves cut out of the depth of half an inch and the length of two inches, forming four places to take hold of each box in order to handle or remove it. Each box is divided within by a partition board a half inch or more in thickness, so placed as to divide the box into two unequal apartments, the front or main part being about four fifths and the rear about one fifth of the whole box. within the front or main part of each box are four upright sticks made round or square, two running

[illegible].

running crosswise and two running lengthwise of the box
and fastened on the sides & ends of the box at the middle
thereof, in holes or places formed for that purpose. Through
the top of each box are two apertures each about two inches
square one at the centre of the front or main part of the
box - and the other is in the rear of the former one at the
partition board, so that the back part of this aperture is on
a line with the front surface of the partition board, affor
=ing a free, even and unobstructed passage for the bees
upon the front surface of said board and through this
aperture. at or near the top of the partition board in each
box are two apertures each two inches square and placed
five inches from the sides of the box - thus forming two
passages for the bees through the partition board into the
rear - apartment. This apartment contains two small boxes
together of sufficient size to fill the same. and each having
an aperture cut into the front side at such place & in such
manner as to correspond with the apertures in the partition
board; so that free passages for the bees are opened from
the front or main apartment into the small rear boxes.
The board or piece that closes the back end of the rear
apartment is hung at one side with hinges and swings
back & forth so as to open and close this apartment at
pleasure. Four thin flat slides for each box of suf-
ficient width to cover the apertures through the top
of the box and the partition board - these slides pass
out through the sides of the box so as to be handled
and regulated at the outside - by means of which the
apertures in each box can be opened & closed as [illegible]
occasion may require. At the front end of each box
at the bottom thereof and as near the centre as might
is a mouth or orifice three inches in length and one
fourth of an inch or more in height affording a free
passage

[illegible]

passage for the bees to go in and out of the hive. The three
main boxes above described are open at the bottom, and are
put up in this manner; The third or lower one is placed on
a board of the same dimensions as the box except that it projects
about two inches in front,— the second or middle box is placed
on the top of the third or lower one so that the top board of
the third or lower box serves as a bottom for the second
or middle one— and the first or upper box is placed on
the top of the second or middle one the top board of which
serves as a bottom for the first or upper one, upon the
upper box are placed two small boxes about three inches
high, each having an aperture through the under side
to correspond with the apertures through the top of the
box, directly over which they are respectively placed,
so that a direct passage for the bees is formed through
the top of the first or upper main box into these lesser
ones; over these small upper boxes is placed a plain
box or cover closed at the ends, sides & top, & open at the
bottom of the length & width of the main upper box &
three inches high in the clear covering the whole
secure and tight.—— In the use and application of
this hive, and the management of bees. I proceed
in general as follows;— commencing with a young or
swarm I locate them in the main apartment of the
first or upper box with free communication to every part
of the whole hive by keeping the various apertures open;—
there I suffer them to remain until the following spring,
when if I desire to increase my stock by additional swarms
I examine the second or middle main box and if I find
none or but little comb formed there from their
labors of the previous season I close the apertures
leading to the second or middle box and keep them closed
(until) the bees for want of room hang upon the outside outside of the hive when it may be necessary to open them) until they have swarmed once — immediately after which I open the apertures leading to the second or middle box and close the mouth or orifice of the first or upper one; — There I suffer them to remain, until after the swarming time of the third season at which time the first or upper box is abandoned by the bees being left as their store house and filled with honey and I then or soon afterwards remove it, without in any manner affecting the other boxes or impairing the prosperity or prejudicing the labor of the bees. Upon removing the first or upper box as above mentioned I place over the apertures through the top of the second or middle one the two small boxes before described and over these I place the plain box or cover above mentioned. In the following October or when the working time of the third season is over I remove the small boxes on the top take out their contents and replace them — and I then place under the two main boxes the third or lower one which leaves the hive in the same form as at the commencement of the first season. I let the small boxes and their contents in the rear of the main ones remain with the bees during the winter and until the bees are enabled to support themselves by their labors, when I remove them take out their contents, & return them to their places. Pursuing this course, the first or main box may in each succeeding year as in the third season above mentioned be removed and its contents taken out. If I commence with an old swarm I place the box or hive containing it in the stead of the first or upper box & upon the top of the second or middle one, and then treat them in the manner before described.

Above I have contemplated only the use of the hive entire, composed of the three main & the lesser boxes and

[illegible]

and placed together as before mentioned and this is the best and most successful mode of treatment; but these main boxes may be used single or double and in this way are an improvement and in whatever way I place together the main boxes whether single or double I use also the small rear and upper boxes and place over these latter the plain box or cover before described.

I claim as new and as my own invention or an Improvement and for the use of which I ask an exclusive privilege the entire art of managing Bees as hereinabove described—together with the Bee hive and its component parts as above constructed excepting only the small boxes placed on the top of the first or main upper main box;— the four cross sticks in the main part of each box and the mouth or orifice in the front of the same.

Witnesses

Eben Britton

N. S. Britton

E. P. Hurlbut

[illegible]

[illegible]